April 16, 1968     C. G. SCOTT     3,377,874
MOTION CONVERTER
Filed Nov. 26, 1965     2 Sheets-Sheet 1
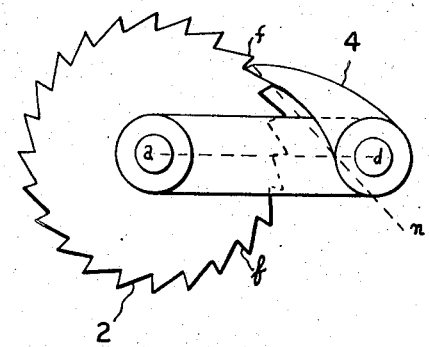
FIG. 1
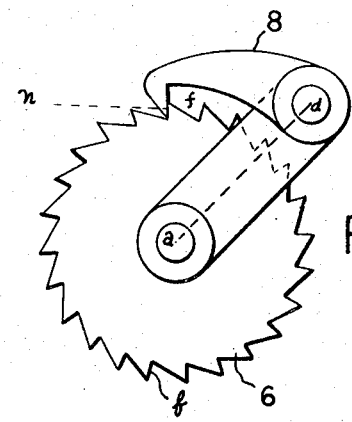
FIG. 2
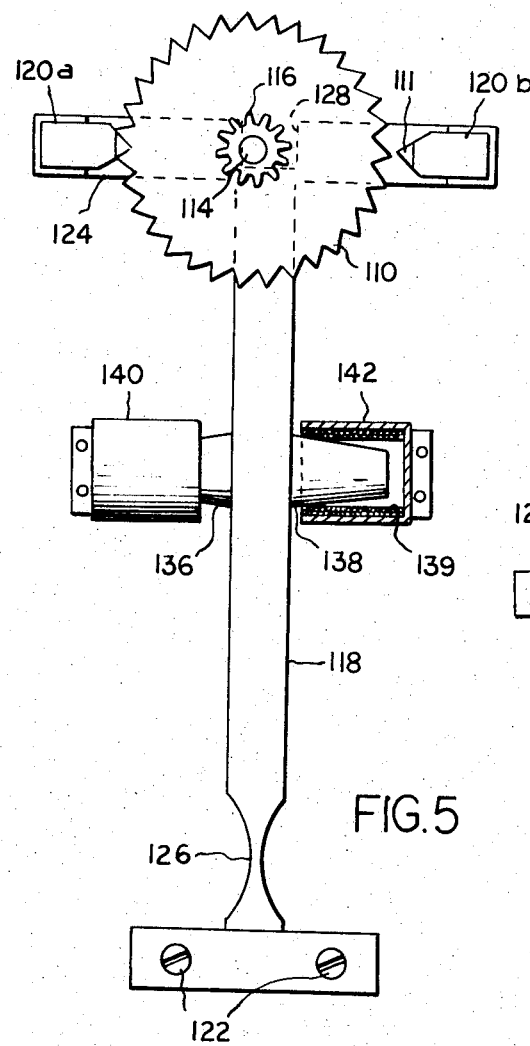
FIG. 3
FIG. 5
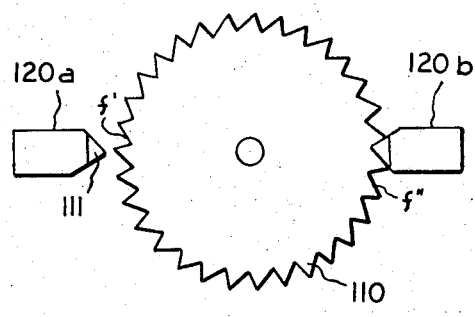
FIG. 4
INVENTOR.
CHARLES G. SCOTT
BY *Norman L. Wilson Jr.*
HIS ATTORNEY April 16, 1968   C. G. SCOTT   3,377,874
MOTION CONVERTER
Filed Nov. 26, 1965   2 Sheets-Sheet 2
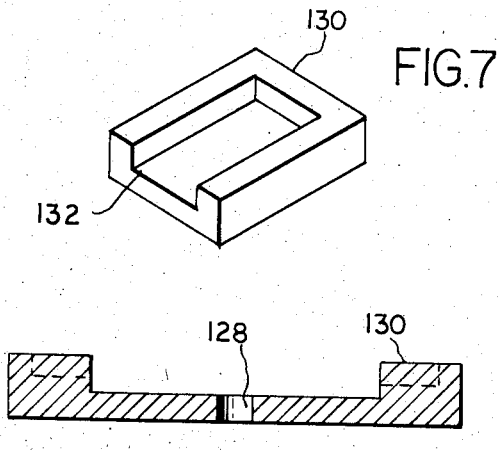
FIG. 7
FIG. 6
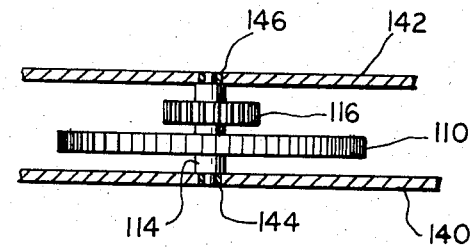
FIG. 8
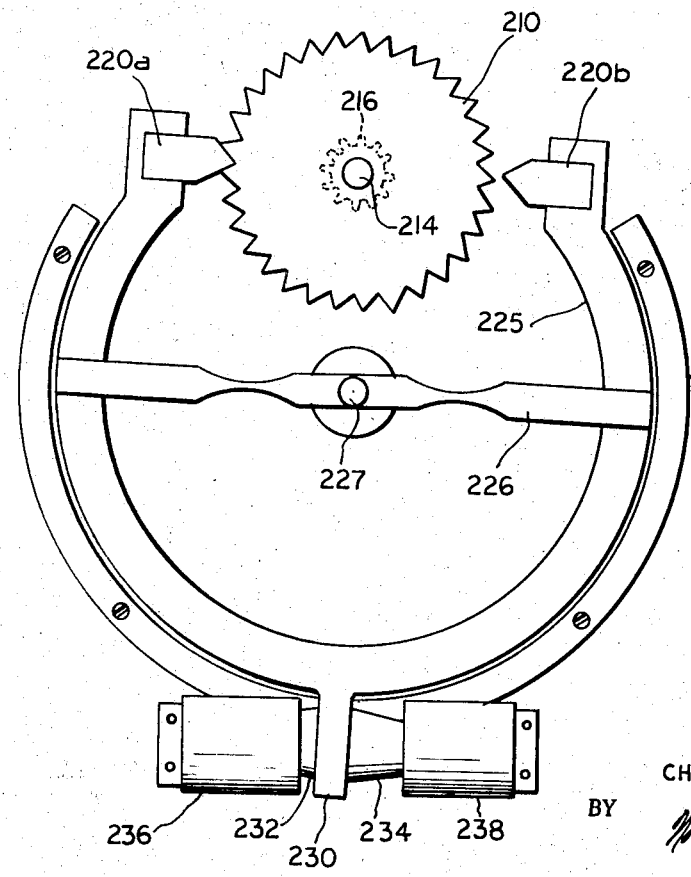
FIG. 9
INVENTOR.
CHARLES G. SCOTT
BY
Norman L. Wilson Jr.
HIS ATTORNEY United States Patent Office 3,377,874
Patented Apr. 16, 1968

3,377,874
MOTION CONVERTER
Charles G. Scott, 106 Market St.,
Kingsport, Tenn. 37660
Filed Nov. 26, 1965, Ser. No. 510,019
6 Claims. (Cl. 74—143)

ABSTRACT OF THE DISCLOSURE

A motion converter is provided for use in electronic timepieces and other timing instruments for converting reciprocating motion of semi-continuous circular motion. A toothed indexing wheel is driven by a pair of oppositely disposed facing flat surfaced detents mounted on an oscillating bar or ring. The detents drive the wheel by alternate engagement with the acting tooth face on opposite sides of the wheel during oscillation.

---

This invention relates to a motion converter. In one of its aspects the invention relates to a motion converter capable of converting reciprocating motion to intermittent or semi-continuous circular motion. In other words the oscillatory movement of a mechanical vibrator is converted into rotary movement.

The motion converter of this invention, among other uses, will be eminently suited to a timepiece which includes a vibrator, and wherein the rotary movement obtained from the converter drives the timepiece mechanism. Timepieces of the type to which this invention has application are disclosed in U.S. 3,070,951, 2,949,727 and 2,929,196. These patents and others such as U.S. 2,900,786, 2,908,174, 2,960,817 and 2,888,582 are concerned with electric timepieces which incorporate suitable electrical means for oscillating a mechanical vibrator, the electrical means being well known.

In the electric timepieces which are described in the patents referred to, a drive element such as a pawl is attached to one of the tines of a vibrator of the tuning fork type. This pawl cooperates with a ratchet wheel so as to cause rotation thereof during oscillation of the tines. The pawl reciprocates with a stroke the length of which is dependent upon the amplitude of oscillation of the tines. The electric means employed, such as a transistorized push-pull electric circuit, are capable of normally maintaining the amplitude of oscillation within the range wherein the stroke of reciprocation of the pawl, in a direction substantially tangent to the ratchet wheel at the point of contact, is at least as great as the pitch of the ratchet teeth but not greater than twice this pitch. The rotational speed of the ratchet wheel is thus proportional to the frequency of the oscillation of the tines. The frequency of the oscillation of the tines can be maintained constant with an extreme degree of accuracy.

In practice, in timepieces referred to, when the pawl moves forwardly in one direction it engages the ratchet wheel positively and causes the wheel to rotate in one angular direction. One of the disadvantages of a ratchet wheel is that when the pawl moves backwardly in the opposite direction it engages the ratchet wheel frictionally and causes, or at least tends to cause, the ratchet wheel to rotate in the opposite angular direction. If the pawl were permitted so to rotate the ratchet wheel in this opposite direction the pawl might not, upon completing its backward stroke, come into engagement with the next ratchet tooth. Instead, the pawl might remain in engagement with the same tooth so that such reciprocation of the pawl would not necessarily result in the proper angular displacement of the ratchet wheel, thereby adversely affecting the accuracy of the timepiece.

Another disadvantage of the use of a ratchet in an electric timepiece is that after the pawl has completed its forward movement and commenced its backward movement, the ratchet wheel, no longer subject to the driving action of the pawl, will tend to continue its rotation under the influence of its own inertia or momentum. If this is permitted to occur, successive reciprocation of the pawl will not necessarily find the same engagement with successive ratchet teeth, again adversely affecting the accuracy of the timepiece. One of the methods of overcoming the disadvantages described involves the use of a braking means such as a second pawl.

In accordance with this invention, however, a more positive means for converting the described motion is employed which overcomes the disadvantages of a ratchet wheel. By the practice of this invention the conversion of oscillatory movement into rotary movement is accomplished without the usual ratchet wheel. Ratchet wheels are of two types. A ratchet wheel can be said to be pushed by a detent, pulled by a click, and held in place by a pawl. The surface or face of the tooth which is driven by the detent, click or pawl, is called the acting face. Stated in another way a ratchet wheel is driven by the action of the detent or click on the side having the greater slope. In order that a detent or click retain its hold on the tooth of a ratchet wheel, the common normal to the acting face should pass inside the axis in the case of a pushing detent, and outside the axis in the case of a pulling click. The normal might pass through the axis, but the click or detent will be more securely held if the normal is located according to the above rule.

Referring now to the wheel of this invention, the tooth surface concerned, or the acting face, is not the surface which the detent positively engages in acting on a tooth in a ratchet. It is not the tooth of greater slope. Rather the acting face in the case of the wheel of this invention is the tooth surface having the lesser slope. The wheel of this invention is, therefore, not a ratchet wheel. Consequently it will be called an index wheel.

The bottom of the space between teeth is called the root or dedendum circle. The slopes of the sides of teeth are relative to a line through the axis of the wheel and the root. A circle passing through the outer ends of the teeth is called addendum. The angle through which a driven gear or wheel of this type turns while being pushed along by a detent is called the angle of action of the driven wheel. In a ratchet wheel the angle of action is usually the angle through which the pawl or detent travels during engagement with the ratchet wheel. In the case of the index wheel of this invention the angle of action is the angle between the addendum and the root along the acting face.

An object of this invention, therefore, is to provide a motion converter which is capable of operating with greater accuracy than a ratchet wheel.

Another object of this invention is to provide a motion converter capable of converting oscillatory movement of a mechanical vibrator into rotary movement without the use of braking means.

A still further object of the invention is to provide a motion converter which can be incorporated into a timepiece mechanism.

These and other objects are accomplished in a timepiece having a timepiece mechanism by the provision of a base; and an oscillating lever mounted on said base, the lever carrying a pair of oppositely disposed, facing detents. A toothed index wheel is rotatably mounted on the base between the detents, and a reciprocating driving means is provided for oscilating said lever. The detents drive the wheel by alternate engagement with tooth surfaces on opposite sides of the wheel, during said oscillation.

An important distinction between the index wheel contemplated herein and a ratchet wheel is that the engagement is frictional against the face of the tooth having a common normal passing away from a line between the vibrational axis and the detent, rather than positive against the face of the tooth having a common normal crossing said line. The index wheel is driven as the detent is urged through the total tooth depth across this acting face of the tooth.

For a better understanding of the invention, various features are shown in the accompanying drawings. The figures in the drawings are illustrative and not limiting since only sufficient mechanism has been shown to illustrate various features of the invention.

In the figures:

FIG. 1 is a top view of a conventional ratchet wheel.

FIG. 2 is a top view of another conventional ratchet wheel.

FIG. 3 shows, in top view, the index wheel of this invention.

FIG. 4 is another top view of the index wheel of the invention illustrating how it is driven.

FIG. 5 shows one type of lever by which the index wheel of the invention is rendered operable in a timepiece.

FIG. 6 is an end view of the crossbar shown in FIG. 5.

FIG. 7 is a portion of the end view of FIG. 6 showing how detents are positioned in the crossbar.

FIG. 8 shows one means of supporting the index wheel, its arbor, and its pinion in a timepiece.

FIG. 9 is a top view of another type of oscillating lever.

Referring specifically to the figures in the accompanying drawings, FIG. 1 shows a conventional ratchet wheel 2 being driven by a pawl 4. It can be seen that a normal $n$ to the acting face $f$ passes inside the axis of the detent. It crosses a line, shown as dotted line $a-d$, between pawl 4 and its axis of rotation, which is also the axis of ratchet wheel 2.

FIG. 2 shows another ratchet wheel 6 wherein a click 8 pulls instead of pushes. The common normal $n$ to the acting face $f$ is outside the axis of the pulling click. The normal $n$ does not cross a line, dotted line $a-d$, between the axis of click 8 and its axis.

FIG. 3 shows the driving action contemplated by this invention. It will be seen that index wheel 10 is driven by a detent 12 but using a different acting face. Comparing FIGS. 1, 2 and 3 it is apparent that ratchet wheels 2 and 6 are driven by the engagement of a pawl such as 4 or 8 against the side of the tooth which has the greater slope. In other words the acting face is the steeper tooth side and the wheel is driven by the positive action of the pawl against this acting face. The opposite face, that is the side opposed to the acting face, in the normal ratchet wheel can be of any slope so long as the pawl is so disposed according to the rule given hereinbefore that it does not slip off of the acting face during operation. The opposite face serves merely to enable the pawl to lie at the proper angle against the acting face.

In the case of the index wheel of this invention, the tooth side with the least slope, which is normally the opposite face of a ratchet wheel, is the acting face. The side with the steeper or greater slope, which is normally the acting face, is the opposite face of the wheel employed herein. In the drawings, therefore, acting face $f$, shown on index wheel 10 of FIG. 3, is the face with the least slope, whereas the opposite face $o$ is the side with the greater slope. In addition index wheel 10 is driven by urging detent 12 frictionally across the acting face $f$ as illustrated in FIG. 3. Index wheel 10 is thus frictionally driven whereas a normal ratchet wheel is positively driven. This being the case, it is clear that the slope of opposite face $o$ is not particularly important. However, generally it will have a slope in the range of 1 to 3 depending on the opposite side.

In the case of the acting face, a more gradual slope will means that more power will be necessary to drive the detent across the tooth face. Desirably, therefore, the slope of acting face $f$ will be around 1, but slightly less, depending on accuracy of machining. Thus the slope of the longer side will be very slightly less than 1, say .999 to .555 depending on tolerances and accuracies of instruments it is being used in. As indicated, a more gentle slope, less than .99, can be used, such as .55 to .25, but there is no advantage to such use. Thus, looking at index wheel 10 it will be seen that since there is a steep side and a more gradual side of each tooth the index wheel contemplated herein is a wheel with teeth having a substantially rip-saw tooth configuration. The slope of such a wheel is determined by assuming a line through the axis of the wheel and a root to be the $y$-axis. The $x$-axis is a line perpendicular thereto at the same root.

Looking at FIG. 3 it can be seen that the angle of action $\theta$ of index wheel 10 is defined by the partial rotation of index wheel 10 as detent 12 is frictionally urged across its acting face $f$. Angle $\theta$ is usually measured along the addendum circle, the angle lying between the root and the addendum. It can also be seen that once the detent reaches the root of the wheel it will no longer drive the index wheel after withdrawal. This is overcome by the use of two detents as shown in FIG. 4.

From FIG. 4 it will be seen that this invention contemplates a pair of oppositely disposed, facing detents 120a and 120b and a toothed index wheel 110 rotatably mounted therebetween. As shown in FIGS. 4 and 5 detents 120a and 120b drive wheel 110 by alternate engagement with acting tooth faces on approximately opposite sides of the wheel, the detents being slightly out of line with each other properly to engage their respective acting faces. It will be apparent from FIGS. 4 and 5 that when detent 120b leaves a tooth, detent 120a engages an acting face of a tooth on the other side of wheel 110. Acting face $f''$ is below detent 120b, whereas acting face $f'$ is above detent 120a. Each detent in FIGS. 4 and 5 is forcing index wheel 110 in a clockwise direction. Obviously inverting the index wheel and switching the detents results in counterclockwise rotary movement of the wheel. In other words if index wheel 110 were turned over its tooth surfaces would be oppositely directed.

As indicated, FIGS. 4 and 5 show that detents are so positioned that when one clears an opposite face, the other detent is in engagement with the acting face on the opposite side of the wheel. If the detents are so positioned that there is a minimum of space between the index wheel of the detent being withdrawn therefrom at the time the approaching detent engages its acting face, the index wheel will have no freedom of rotation between the detents and consequently no inertia or momentum. If the detents are farther apart it will, of course, be necessary to employ any of the known braking means. However, this generally will not be the case.

Referring again to FIGS. 4 and 5 it will be seen that even though index wheel 110 is frictionally operated, means are nevertheless provided for minimizing frictional force components. Thus while a blade can be employed as a detent, the power requirement due to the friction between the surfaces will be greater than the power required to drive a detent such as is shown in FIG. 4. It is preferred that the slope of the detent tip be parallel to the acting face so that the two surfaces engage each other with a minimum of friction. In addition the tip of the detent, which fits between the teeth, will be jeweled at 111 further to reduce wear. Desirably the configuration of the end of the detent will correspond exactly to the space between the acting tooth face and the opposite face, the detent being a perfect fit when the tip thereof reaches the root.

It will be obvious that means provided herein for converting a reciprocating movement to intermittent or semi-continuous circular movement have application to various devices, particularly to instruments used in rocketry and the like. Nevertheless, perhaps the most important use of the means contemplated will be in timepieces wherein the detents will be put into high frequency vibration. For use in timepieces a lever will be provided to bring about the oscillation or reciprocation of the detents. Two levers which can be used for this purpose are shown in FIGS. 5 and 9.

Referring first to FIG. 5, index wheel 110 is carried by an arbor or shaft 114 which will extend through the timepiece base plate. In FIG. 5 a pinion 116 is secured to, and carried by, arbor 114. The oscillating lever of FIG. 5 is a vibrating T-shaped tuning bar 118. The tuning bar is fixed to a base plate by the use of a pair of screws 122, although the bar can be welded or soldered to the base plate. Tuning bar 118 is secured at its foot to the base plate so that its opposite end carrying crossbar 124 is its free end capable of oscillating about its own axis 126 of oscillation. The center of crossbar 124 is cut away or slotted as shown at 128 in FIG. 5, so that the crossbar is free to oscillate even in view of the position of arbor 114.

Detents 120a and 120b are mounted on crossbar 124 as shown in FIG. 6 which is an end view of the crossbar itself. The crossbar is raised at each end 130 to hold the detents. As seen in FIG. 7, end 130 is provided with slot 132 into which a detent is secured. Index wheel 110 mounted on arbor 114, as shown in FIG. 5, will thus lie between the facing indexing detents 120a and 120b. As a consequence vibration of the tuning bar will oscillate detents 120a and 120b in and out of the tooth spaces to drive index wheel 110 as described.

Tuning bar 118 will be put into vibration by any of the well known means described in such patents as U.S. 2,900,786 and U.S. 2,949,727 and the other patents noted hereinbefore. Such means are incorporated herein by reference. Thus tuning bar 118 can be vibrated by mounting drum magnets 136 and 138 on the sides of the stem of tuning bar 118. A pair of coils will be mounted within tubular carriers 140 and 142 which in turn are mounted on the base plate. These coils 139, with magnets 136 and 138, will form transducers, the polarity of the magnets being such that the tuning bar will vibrate. The vibration can be achieved through the use of a transistorized circuit, the circuit containing driving coils, phase sensing coils, and an L-C circuit as is known in the art. The driving of index wheel 110 according to this invention will bring about the rotation of pinion 116. Pinion 116 cooperates with a driving gear to transmit the rotary movement of the dial gear train (not shown) of the timepiece mechanism. The main gear train is thus eliminated by this invention. The number of gears in the dial train will be determined by the frequency of oscillation of the lever. The placement of the gears is illustrated in FIG. 8. This figure shows index wheel 110, arbor 114 and pinion 116. These elements are held in base plate 140 and top bridge 142. In timepieces, bearings 144 and 146 will be jeweled.

Another type of oscillating lever is shown in FIG. 9. In this instance rather than a T-shaped tuning bar an oscillating ring 225 is employed. Ring 225 is carried by leaf spring 226 which is positioned through its diametral center. Leaf spring 226 is secured to the base plate by means of pin 227 at the axis of ring 225 so that the ring is capable of oscillating about its own axis of oscillation. To limit partial rotation or deflection of ring 225 due to excessive shock, a shock ring 228 is positioned around the oscillating ring and secured to the base plate. To provide for index wheel 210, ring 225 has a segment thereof removed to form two free vibrating ends carrying detents 220a and 220b. The detents are mounted in slots as described in connection with FIG. 7. Arbor 214 carrying a pinion at one end thereof beneath the base plate extends through the base plate into the open segment between detents 220a and 220b. Index wheel 210 will be driven by the detents in the free vibrating ends of oscillating ring 225.

The rotation of index wheel 210 will be achieved by the action of detents 220a and 220b on the acting faces of index wheel as described hereinbefore. The oscillation of oscillating ring 225 is accomplished by extension 239 to which drum magnets 232 and 234 are attached. Through the use of coils within tubular carriers 236 and 238, and a circuit such as is described hereinbefore the magnets will oscillate. This in turn will bring about the oscillation of ring 225 by virtue of the fact that it is suspended at its axis by means of leaf spring 226. The oscillation of ring 225 will again drive detents 220a and 220b into and away from index wheel 210, bringing about the rotation of the index wheel as described.

It will be clear that given an understanding of the invention, other variations will occur to those skilled in the art. Thus, to bring about the vibration of the various levers it is obvious that various push-pull circuits and vibrating means can be used in lieu of the transducer elements described. As another example, the vibrating means of the oscillating ring can be inside the ring rather than outside as shown. In addition if the vibrating means is left outside, the ring shock ring members, in section, can be placed inside the ring. Such ramifications and other obvious embodiments and rearrangements are deemed to be within the scope of this invention.

What is claimed is:

1. In a timepiece having a timepiece mechanism, in combination: a base plate; an oscillating lever mounted on said base plate, the oscillating lever being a vibrating T-shaped tuning bar carried at its foot by said base plate, so that its end carrying the crossbar is its free end capable of oscillating about its own axis of oscillation, the crossbar having a slot in the center thereof; a pair of oppositely disposed, facing detents carried by the crossbar; a toothed index wheel having teeth with flat tooth faces in substantially rip-saw configuration, one flat tooth face having a steep slope, the other a gradual slope, the face having the lesser slope being the acting face, the face having the greater slope being the opposite face, the index wheel being rotatably mounted on said base plate between the detents, the index wheel being carried by an arbor extending through the base plate; a pinion on the end of the arbor opposite the index wheel, said arbor being positioned within the slot in the tuning bar; and a reciprocating driving means for oscillating the tuning bar; the pair of indexing detents being mounted flatly on said crossbar and directed toward each other, each detent having flat oppositely sloping surfaces forming a V-shaped tip which fits into the space between the acting tooth face and the opposite tooth face, the slope of the flat side of the detent tip which cooperates with the acting face being the same as that of the acting face so that the flat side is parallel to the acting face during engagement therewith, said index wheel being so disposed between the facing indexing detents that they are directed toward its axis, the wheel being frictionally driven as the flat detent surface is urged across the flat acting face parallel thereto and in contact therewith as the crossbar oscillates, to convert the oscillation of said bar into a rotary movement of the pinion to be transmitted to a gear train by said pinion, and wherein the detents are so positioned that when one clears an adjacent tooth the opposite detent is in engagement with the acting face on the opposite side of the wheel so that the index wheel has no freedom of rotation between the detents.

2. The timepiece of claim 1 wherein the slope of the acting face with respect to a line passing through the axis and the root is .99 to .25.

3. The timepiece of claim 1 wherein the configuration of the tip of the detent corresponds exactly to the space between the acting tooth face and the opposite face.

4. In a timepiece having a timepiece mechanism, in combination: a base plate; an oscillating lever mounted on said base plate; a pair of oppositely disposed, facing detents carried by said lever; a toothed index wheel having teeth in a substantially rip-saw configuration rotatably mounted on said base plate between the detents; and a reciprocating driving means for oscillating said lever;

wherein the detents are so placed as to drive said wheel by alternate engagement with tooth surfaces on opposite sides of the wheel during said oscillation, wherein the oscillating lever mounted on said base plate is an oscillating ring carried by a leaf spring through its diametral center, the spring being secured to the base plate at the axis of the ring so the ring is capable of oscillating about its own axis of oscillation, said ring having a segment thereof removed to form two free vibrating ends, wherein of the pair of detents, one detent is carried by each free end, each detent being directed toward the other, wherein the index wheel and a pinion are carried by an arbor extending through the base plate, said arbor being positioned in the open section created by the removed segment, and wherein the index wheel is so disposed between the facing indexing detents as to be frictionally driven as a detent is urged across the acting face in contact therewith as the ring oscillates, to convert the oscillation of said ring into a rotary movement of the pinion to be transmitted to a gear train by said pinion, and wherein the detents are so positioned that when one clears an adjacent tooth the opposite detent is in engagement with the acting face on the opposite side of the wheel so that the index wheel has no freedom of rotation between the detents.

5. The timepiece of claim 4 wherein the slope of the acting face with respect to a line passing through the axis and the root is .99 to .25.

6. The timepiece of claim 4 wherein the configuration of the tip of the detent corresponds exactly to the space between the acting tooth face and the opposite face.

References Cited

UNITED STATES PATENTS

| | | | |
|---|---|---|---|
| 745,279 | 11/1903 | Higgins | 74—143 |
| 1,517,008 | 11/1924 | Jones. | |
| 1,979,028 | 10/1934 | Ewart | 74—143 |

FOREIGN PATENTS 1,061,621  12/1953  France.

FRED C. MATTERN, JR., *Primary Examiner.*

W. S. RATLIFF, *Assistant Examiner.*